US007117439B2

(12) United States Patent
Barrett et al.

(10) Patent No.: US 7,117,439 B2
(45) Date of Patent: Oct. 3, 2006

(54) ADVERTISING USING A COMBINATION OF VIDEO AND BANNER ADVERTISEMENTS

(75) Inventors: Peter T. Barrett, San Francisco, CA (US); Daniel Danker, Sunnyvale, CA (US)

(73) Assignee: Microsoft Corporation, Redmond, WA (US)

(*) Notice: Subject to any disclaimer, the term of this patent is extended or adjusted under 35 U.S.C. 154(b) by 877 days.

(21) Appl. No.: 10/000,150

(22) Filed: Oct. 19, 2001

(65) Prior Publication Data

US 2003/0076347 A1 Apr. 24, 2003

(51) Int. Cl.
*H04N 5/44* (2006.01)
*G06F 15/16* (2006.01)

(52) U.S. Cl. .................. 715/719; 709/231; 725/34; 725/42

(58) Field of Classification Search ............. 345/719, 345/745, 738, 716, 760, 774; 705/14; 725/41, 725/42, 34, 35, 86, 87, 101; 709/231; 715/513, 715/720
See application file for complete search history.

(56) References Cited

U.S. PATENT DOCUMENTS

| | | | | |
|---|---|---|---|---|
| 6,011,537 A * | 1/2000 | Slotznick | ............ | 345/733 |
| 6,137,834 A * | 10/2000 | Wine et al. | ............ | 375/240 |
| 6,141,010 A | 10/2000 | Hoyle | ............ | 345/356 |
| 6,160,570 A | 12/2000 | Sitnik | ............ | 348/1 |
| 6,185,586 B1 * | 2/2001 | Judson | ............ | 715/513 |
| 6,201,536 B1 * | 3/2001 | Hendricks et al. | ............ | 715/716 |
| 6,211,901 B1 * | 4/2001 | Imajima et al. | ............ | 725/93 |
| 6,248,946 B1 * | 6/2001 | Dwek | ............ | 84/609 |
| 6,317,761 B1 * | 11/2001 | Landsman et al. | ............ | 715/513 |
| 6,338,094 B1 * | 1/2002 | Scott et al. | ............ | 709/245 |
| 6,347,400 B1 | 2/2002 | Ohkura et al. | ............ | 725/60 |
| 6,496,857 B1 * | 12/2002 | Dustin et al. | ............ | 709/219 |
| 6,639,608 B1 * | 10/2003 | Itakura | ............ | 345/738 |
| 6,687,906 B1 * | 2/2004 | Yuen et al. | ............ | 725/42 |
| 6,718,551 B1 * | 4/2004 | Swix et al. | ............ | 725/32 |
| 6,728,776 B1 * | 4/2004 | Colbath | ............ | 709/231 |
| 2001/0003184 A1 | 6/2001 | Ching et al. | ............ | 4/707 |

(Continued)

FOREIGN PATENT DOCUMENTS

| | | |
|---|---|---|
| WO | WO 99/55066 | 10/1999 |
| WO | WO 00/33197 | 6/2000 |
| WO | WO 00/49801 | 8/2000 |

OTHER PUBLICATIONS

Ehrmantraut et al., *The Personal Electronic Program Guide—Towards the Pre-selection of Individual TV Programs*, CIKM, pp. 243-250, 1996.

(Continued)

*Primary Examiner*—Tadesse Hailu
*Assistant Examiner*—Blaine Basom
(74) *Attorney, Agent, or Firm*—Workman Nydegger

(57) ABSTRACT

In a system that includes a processor and a display device on which video programming can be displayed, a method for transitioning to a video advertisement by displaying a related banner advertisement. The method includes generating, on the display device, a display screen on which a video advertisement is to be displayed, the display screen being generated at a time before a time at which the video advertisement is available to be displayed. A banner advertisement is displayed on the display screen at a region that coincides with a region where the video advertisement is to be displayed. The banner advertisement can have a subject matter that is related to that of the video advertisement or alternatively have any subject matter. When the video advertisement becomes available to be displayed, the method can include replacing the banner advertisement with the video advertisement.

13 Claims, 6 Drawing Sheets

U.S. PATENT DOCUMENTS

| | | |
|---|---|---|
| 2002/0129368 A1 | 9/2002 | Schlack et al. ............... 46/725 |
| 2005/0210502 A1 | 9/2005 | Flickinger et al. ............ 34/725 |
| 2005/0216936 A1 | 9/2005 | Knudsen et al. .............. 42/725 |
| 2005/0251824 A1 | 11/2005 | Thomas et al. ............... 42/725 |

OTHER PUBLICATIONS

Rosengren, J., *Electronic Programme Guides and Service Information, Phillips J. Res.*, vol. 50 No. 1/2, pp. 252-265, 1996.

Tarrant D.R., *An Open European Standard for an Electronic Programme Guide, International Broadcasting Convention*, pp. 440-446, Sep. 1997.

Morington-West, A., *Some Issues With ESGs and EPGs Helping the Consumer to Navigate, The Institution of Electrical Engineers*, pp. 1-5, 1998.

Khosrowpour M. et al., *Effective Utilization and Management of Emerging Information Technologies, IRMA International Conference*, pp. 652-656, May 1998.

Claria Corporate Overview [online] Redwood City (CA); [retrieved Jun. 30, 2004]. Retrieved from the Internet <URL:www.claria.com/companyinfo/>.

Inan, D.; Fasten Your Broadband Belts [Broadband Networks and Services]; Telephony; vol. 230, No. 7, Feb. 12, 1996; pp. 24-25, 28, 30.

\* cited by examiner

ADVERTISING USING A COMBINATION OF VIDEO AND BANNER ADVERTISEMENTS

BACKGROUND OF THE INVENTION

1. The Field of the Invention

The present invention generally relates to providing advertisements to a viewer of a display device capable of displaying television programming. More specifically, the present invention broadly relates to the delivery of banner and video advertisements as part of an enhanced programming experience.

2. The Prior State of the Art

For numerous years, homes, offices, and other buildings have accessed television programming through airwave broadcasts, cable providers, satellite transmission, and other communication channels. Televisions provide viewers with a varied assortment of entertainment, news, advertisements, and educational programming. From the first broadcasts to current television programming, viewers gather a wealth of knowledge while being entertained. With advances in communication technology and computer systems in recent years, television broadcast viewers no longer are limited to merely watching a television screen. Instead, television broadcast viewers may participate in enhanced programming experiences through use of a set-top box or other similar device. In general, such enhanced programming experiences include those that present images or information in addition to or different from the content of conventional television broadcasts. Unfortunately, not all set-top boxes are capable of providing a viewer with an enhanced programming experience.

As illustrated in FIG. 1, numerous types of set-top boxes or devices are available for delivering broadcast programming to a viewer. Such set-top boxes range from typical cable boxes that have low local storage capacity and low bandwidth to complex set-top boxes that have high local storage capacity and high bandwidth. Each type of set-top box has its own capabilities and limits to the type of enhanced programming experience that may be presented to the viewer. For example, low-end set-top boxes may be incapable of providing an enhanced programming experience, storing large quantities of enhanced programming content, or otherwise extending beyond merely providing the viewer with a numerical representation of the channel watched by the viewer.

As mentioned above, in addition to receiving entertainment, news, educational programming, and participating in enhanced programming experiences, televisions provide an effective delivery medium for advertisements. The sale of broadcast time to advertisers is a major source of revenue for commercial television broadcasters, as is the case for national television broadcasters and their local over-the-air affiliates. Likewise, cable networks derive much of their income from a combination of the sale of advertising time and the receipt of cable subscription fees. Advertising revenue is a leading factor in the currently available diverse selection of commercial television programming. Therefore, broadcast providers continually search and identify different media for providing advertisements to a viewer, such as during an enhanced programming experience.

Typically, advertisements delivered to the viewer during an enhanced programming experience take the form of a banner advertisement. Conventionally, a banner advertisement is static with a single advertising view presented to a viewer. For example, a static banner advertisement may depict a new product with associated slogan, trademark, and the like. Although such static banner advertisements provide relevant information to the viewer, it is desirable to provide a more eye-catching or memorable experience for a viewer, thereby aiding the viewer to remember the product and/or services associated with the advertisement.

Of course, video advertisements are often more effective than static or scrolling banner advertisements. However, video advertisements require greater bandwidth than that required by banner advertisements if they are to be delivered to the set-top box in real time and require greater data storage capacity if they are to be stored locally so that they can be accessed when needed. In addition to the difficulties associated with delivering video advertisements to set-top boxes, particularly low-end units, there are also considerations associated with the timing of the beginning of the video advertisements as will be further described herein. Although banner advertisements and video advertisements can be useful in any of a variety of television viewing situations, they are particularly useful in an electronic program guide interface, an interface that displays various television options, or other such interfaces.

SUMMARY OF THE INVENTION

The present invention relates to systems and methods for combining graphical banner advertisements with video advertisements in an enhanced television environment to provide a unified advertising impression. According to the invention, video advertisements are presented on a display device as part of an interface or image displayed on the display device. The video advertisements are transmitted to a set-top box or other processing device or are stored locally at the set-top box. For instance, the video advertisements are transmitted in a Moving Pictures Expert Group (MPEG) stream in a carousel fashion or otherwise transmitted to the set-top box. Alternatively, the video advertisements can be stored locally and accessed as streaming video when needed if the set-top box has sufficient data storage capabilities.

In any of the foregoing situations, at the moment when a television interface that is to include a video advertisement is rendered on the display device, it is likely that the beginning of the video advertisement will not be immediately available. In general, this means that the video advertisement cannot be immediately displayed at the moment when the television interface is displayed. It is also not desirable to simply cut into the middle of a video advertisement and display only the tail end of the advertisement when the television interface is initially rendered.

For example, if video advertisements are delivered to the set-top box using an MPEG stream, it is likely that when the television interface or image is initially displayed, there will be a period of time ranging from a few seconds to thirty seconds or more until the beginning of a video advertisement is received on the MPEG stream. There may also be a similar periods of advertisement unavailability between consecutive video advertisements, particularly when multiple MPEG streams deliver video advertisements in carousel fashion to the set-top box. Similarly, if the video advertisement is accessed as streaming video, there is typically an appreciable latency that prevents the video advertisement from being immediately displayed.

In order to avoid presenting a blank region where the video advertisement would otherwise be displayed or cutting into the middle of a video advertisement at the moment that a television interface is initially displayed, the present invention provides a unified and seamless advertisement impression by displaying a banner advertisement until such time that a corresponding video advertisement becomes available. This technique can be applied by set-top boxes that receive video advertisements encoded in an MPEG stream in real time or by those that store video advertisements locally. Likewise, the unified and seamless combination of banner advertisement and video advertisement can be applied during the period between video advertisements when the next video advertisement is not yet available.

In this manner, the invention enables set-top boxes, including those that otherwise are incapable of providing significant enhanced programming functionality, to display banner and video advertisements. The invention can also include other enhanced programming features, such as selecting banner advertisements according to viewer profiles, viewer preferences, or other criteria.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or can be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
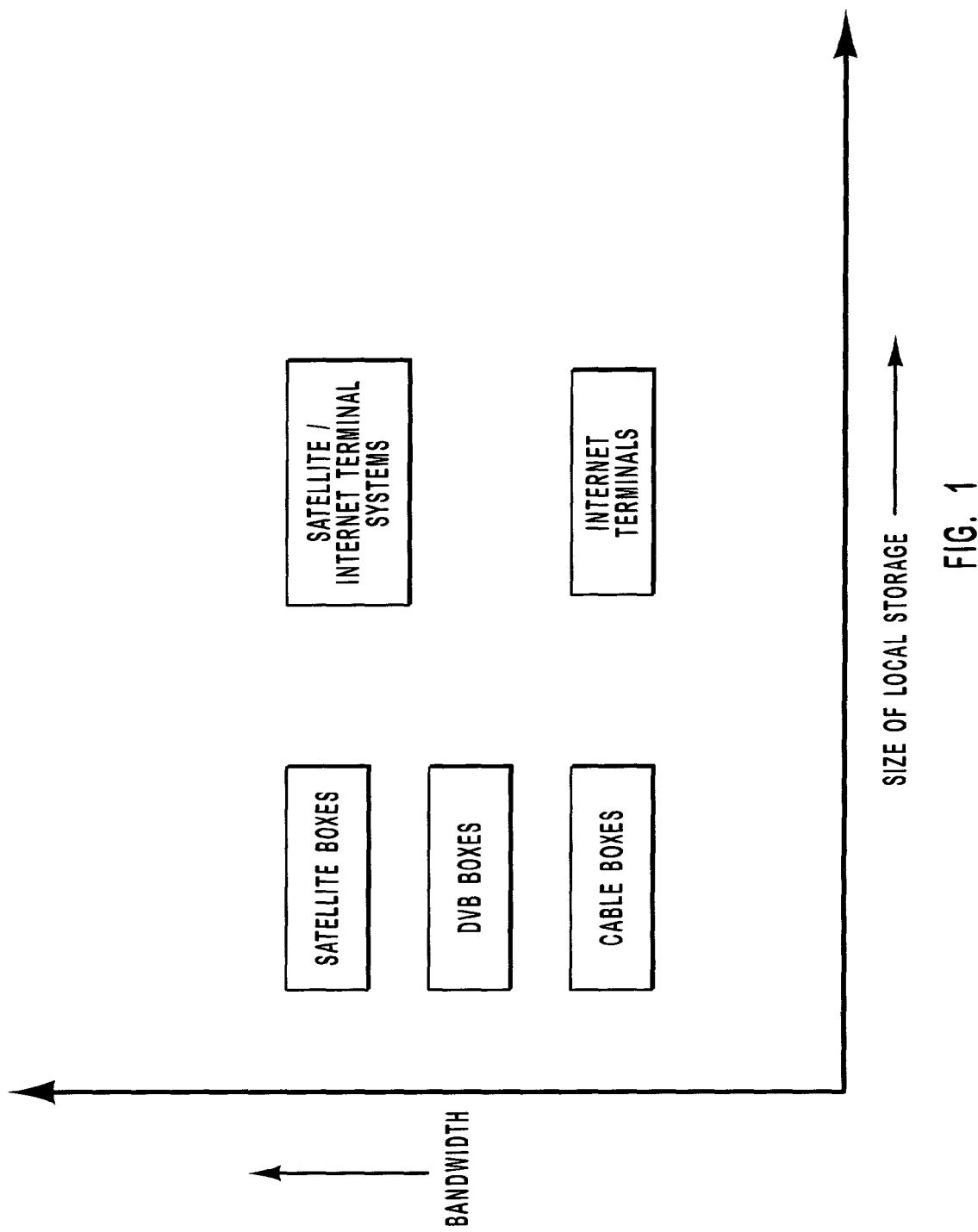
FIG. 1 is a graphical representation of the various types of set-top boxes currently available to receive and deliver broadcast programming.

The present invention extends to both systems and methods for delivering advertisements to a viewer during an enhanced programming experience. More specifically, the present invention extends to both systems and methods for transitioning between banner advertisements and video advertisements during an enhanced programming experience, thereby delivering a fluid enhanced programming experience to the viewer. Additionally, the transition between banner and video advertisements enables the set-top box to accommodate for delays in the receipt of video data associated with the video advertisements. Consequently, the display of banner advertisements maintains a seamless enhanced programming experience, while providing sufficient time for the set-top box to receive the video advertisement to be displayed as part of the enhanced programming experience.

Further, the transition between banner advertisements and video advertisements facilitates delivery of multiple different video advertisements carried upon different delivery streams, without the viewer knowing that such advertisements are carried upon different delivery streams. By transitioning between a banner advertisement and a video advertisement the set-top box receiving the broadcast programming and the available advertisements can select which advertisements to show to the viewer, i.e., target advertisements for the specific viewer participating in the enhanced programming experience or watching broadcast programming by identifying viewer preferences and selecting appropriate video and/or banner advertisements consistent with the preferences.

The transition between a banner advertisement and a video advertisement is particularly useful during the first several seconds that typically pass between the initiation of the display of an EPG screen, another enhanced television screen, or some other portion of the displayed user interface and/or enhanced programming experience and the beginning of the first video advertisement that is to be displayed on the screen. Rather than rendering a blank region on the screen where the first video advertisement is to be displayed, a banner advertisement related to the first video advertisement is displayed at the region. For instance, depending on the length of the video advertisements delivered in real time to the set-top box, there may be a period of a fraction of a second to thirty seconds or more between the initiation of the EPG screen and the beginning of the next available advertisement. Displaying a related banner advertisement during this period provides a smooth transition to the first video advertisement. Further, the present invention can be used to transition between any video advertisements displayable to the viewer or interspersing multiple video advertisements with related or unrelated banner advertisements, whether or not a transition is needed between the ending of one video advertisement and the beginning of a subsequent video advertisement.

The following description relates first to the delivery of banner advertisements and related video advertisements to set-top boxes and further describes various set-top box configurations that can be used with the invention. The description then proceeds to a detailed explanation of how the transition between a banner advertisement and a video advertisement can be executed according to one embodiment of the invention.

The invention will be described in the general context of computer-executable instructions, such as program modules, being executed by one or more, optionally networked, general purpose computers or special purpose computers, such as a set-top box. These computer-executable instructions comprise, for example, instructions and data that cause a general purpose computer, special purpose computer, or special purpose processing device to perform certain functions or groups of functions.

Generally, program modules include routines, programs, objects, components, data structures, etc. that perform particular tasks or implement particular abstract data types. The program modules, and associated computer-executable instructions and data structures represent examples of program code means for executing various method steps, such as those described herein and those known by one skilled in the art in light of the teaching contained herein. The particular sequence of such executable instructions or associated data structures represents examples of corresponding acts for implementing the functions described in such steps.

Embodiments within the scope of the present invention also include computer-readable media for carrying or having computer-executable instructions or data structures stored thereon. Such computer-readable media can be any available media that is accessible by a general purpose or special purpose computer. By way of example, and not limitation, such computer-readable media can include physical storage media such as RAM, ROM, EEPROM, CD-ROM or other optical disk storage, magnetic disk storage or other magnetic storage devices, or any other medium that can carry or store program code means. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Consequently, combinations of the above should also be included within the scope of computer-readable media.

1. Exemplary System for Delivering Banner Advertisements and Video Advertisements as Part of an Enhanced Programming Experience.

Figure 2:
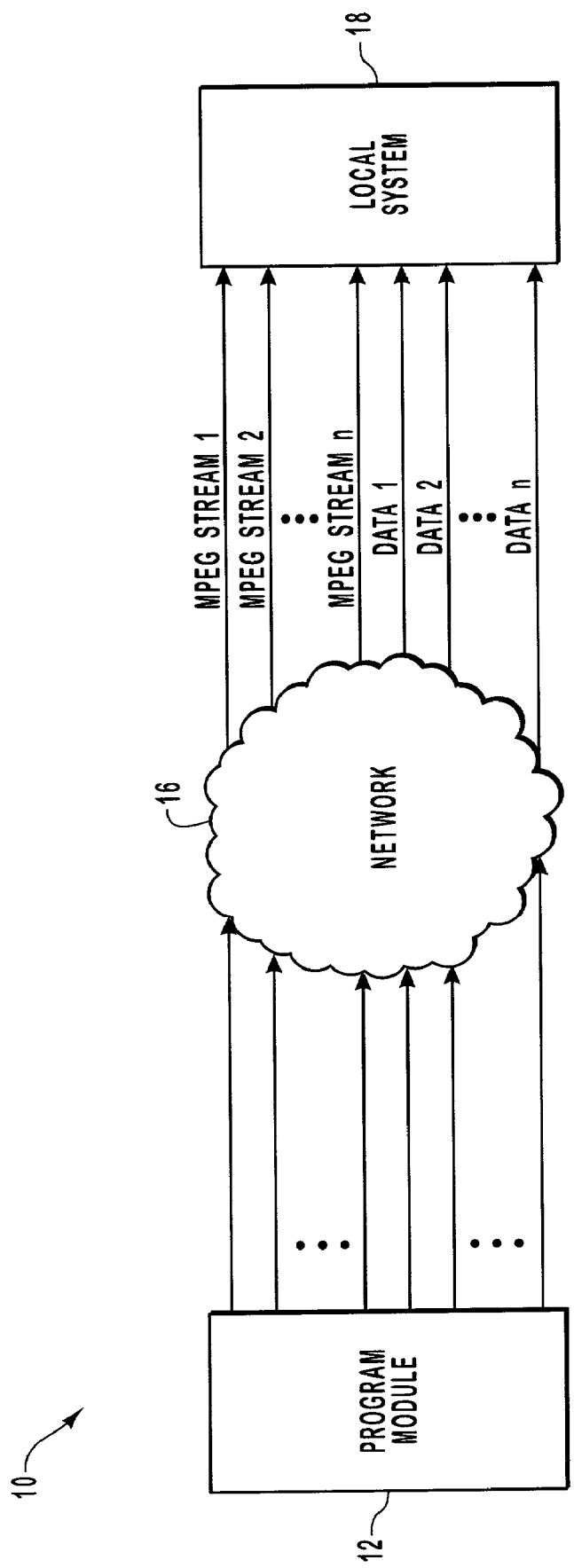
FIG. 2 is a schematic representation of one illustrative operating environment for the present invention.

Referring now to FIG. 2, depicted is an exemplary system capable of delivering one or more banner advertisements and/or one or more video advertisements to a viewer in a simple manner. In this manner, a banner advertisement can be used to introduce a related video advertisement during the period of perhaps several seconds prior to the video advertisement being received at the set-top box.

Depending on the characteristics of the set-top box and the mechanism by which video advertisements are delivered, the use of a banner advertisement in combination with a subsequent video advertisement generates a unified and seamless advertising impression in any of various ways. In any of these embodiments, the unified advertising impression would not be possible if only the video advertisement were used. In systems that receive video advertisements encoded in an MPEG stream in substantially real time using a carousel delivery mechanism, the display of a related banner advertisement is useful for filling the period of perhaps several seconds to thirty seconds or more that are likely to transpire before the receipt of the first full video advertisement. Similarly, during the period of time between successive video advertisements and while the set-top box waits for the beginning of the next video advertisement, the banner advertisement can create the impression of a smooth transition between video advertisements. In systems that access streaming video advertisements from a local storage medium, the banner advertisements are displayed during the latency period as the video advertisement is buffered and prepared for display.

Although banner advertisements and video advertisements can be useful in any of a variety of television viewing situations, they are particularly useful in an electronic program guide interface, an interface that displays various television options, or other interfaces that present to the viewer information rather than or in addition to television content. Such interfaces are referred to herein and in the claims as "display screens" on which a video advertisement is to be displayed and include any type of image or display on which a banner advertisement can be displayed.

The system, designated by reference numeral 10, is capable of delivering banner advertisements and/or video advertisements to local module 18. Although FIG. 2 depicts a single local module 18, one skilled in the art can appreciate that multiple local systems 18 can receive banner and/or video advertisements in accordance with the teaching of the present invention. Moreover, it is noted that the invention can be practiced using other methods of delivering banner advertisements and video advertisements.

As shown, system 10 includes a program module 12 that communicates with local module 18 via a network 16. Program module 12, in this illustrative embodiment, is configured to generate typical programming deliverable to a set-top box, whether such set-top box includes small or large memory capabilities or high or low data bandwidths. For example, program module 12 represents a television broadcast provider, satellite television provider, cable television provider, and the like. Although a single program module 12 is depicted, it is understood that program module 12 can take the form of multiple servers and clients that are optionally networked together via a local area network (LAN) or wide area network (WAN).

Generally, program module 12 is capable of generating multiple MPEG streams of audio and/or video data associated with broadcast programming, such as those MPEG streams designated by reference numerals 1-$n$. When a set-top box associated with local system 18 receives video advertisements using a carousel-type delivery mechanism, as will be described in greater detail below, the video advertisements are encoded in one or more of MPEG streams 1-$n$.

These MPEG streams 1-$n$ use a variety of standards and formats such as MPEG-1, MPEG-2, and MPEG-4 standards and formats. Further, program module 12 acts as a signal source that delivers a single channel of broadcast programming from a recorded medium or a multi-channel signal source that deliver signals capable of being received by a satellite receiver, a cable or optic connection, a terrestrial antenna, or the like. Hence, in some configurations, program module 12 includes a VCR, a DVD, DSS/DVB, cable delivery and reception equipment, local broadcast and reception equipment capable of delivering programming using UHF or VHF, and the like.

In addition to generating various MPEG streams 1-$n$, program module 12 generates and delivers one or more data streams, designated by numerals 1-$n$, to local module 18. Such data streams 1-$n$ include enhanced content, such as but not limited to enhanced content that is synchronized with the broadcast programming delivered via MPEG streams 1-$n$ to local module 18. It can be understood that such enhanced content can also be delivered within MPEG streams 1-$n$ instead of within synchronized data streams 1-$n$. Further, delivery of the enhanced content and broadcast programming need not be synchronized together, but can be delivered in an asynchronous manner to local module 18.

In addition to delivering broadcast programming and/or enhanced content to local module 18, program module 12 optionally supplies data concerning the video advertisements and/or banner advertisements deliverable to local module 18. For example, program module 12 supplies data representing a list of those advertisements, whether banner type or video type, displayable to the viewer during a particular day, week, month, or the like. Similarly, program module 12 delivers data representative of a schedule that defines the particular video and/or banner advertisements deliverable to local module 18 during particular time periods and/or particular broadcast programming carried on a particular MPEG and/or data stream. Further, program module 12 delivers one or more banner content identifiers and/or video content identifiers to local module 18. Subsequently, local module 18 stores such data and information within one of a variety of storage devices, such as but not limited to physical storage media such as RAM, ROM, EEPROM, CD-ROM or other optical disk storage, magnetic disk storage or other magnetic storage devices, or any other medium that can carry or store such data or information.

The video and/or banner advertisement data are be delivered to local module 18 via any of a variety of different manners. For example, program module 12 can deliver the data in a carousel-type manner, in which the video and/or banner advertisement data is delivered to local module as quickly as possible, with little regard to the sequence in which such data is sent or received by local module 18. When multiple MPEG streams 1-*n* are used for delivering video advertisements, the beginning of the video advertisements can be staggered among the multiple MPEG streams or can be synchronized. Multiple MPEG streams enable more and a greater variety of advertisements to be delivered an also can reduce the latency between the moment that a enhanced television interface is displayed and the moment that the next available advertisement begins. However, because the beginning of advertisements can be staggered, multiple streams can introduce latency between the end of an advertisement on one stream and-the beginning of a next advertisement on another stream. The invention can be adapted to display related banner advertisements on the enhanced television interface regardless of the source of latency of video advertisements.

Optionally, program module 12 can deliver the video and/or banner advertisement data in a specific sequential or non-sequential order. Other manners for delivering banner and/or video advertisement data to local module 18 can be identified by one skilled in the art in light of the teaching contained herein. In general, delivering advertisement data in this manner enables the set-top box to display the advertisements substantially in real time, to store selected advertisements for future use, or both.

As previously noted, some set-top boxes have sufficient data storage capabilities to store video advertisements for future use. Such set-top boxes can receive the video advertisements from an MPEG stream transmitted to the set-top box or in any other suitable way in which data can be transmitted. Of course, the transmission mechanisms can vary widely between different set-top box models and the details of such are not critical to the invention.

The broadcast programming and optionally the enhanced programming content inserted or combined with the broadcast programming are deliverable to local module 18 via network 16. Network 16 represents one of a variety of networks upon which the broadcast programming and enhanced programming content may be delivered to local module 18. For example, network 16 represents existing cable television infrastructure, satellite network, over-the-air broadcasting network, standard telephone lines, direct dial connection, and the like.

Communicating with program module 12 and/or enhanced content module 14 is local module 18. Local module 18 is configured to receive one or more MPEG streams 1-*n* and one or more data streams 1-*n* capable of carrying the broadcast programming and/or the enhanced programming content. Further, local module 18 can store the enhanced programming content. Such content within local module 18 includes, but is not limited to, current, future, and optionally past schedules for the delivery of video and/or banner advertisements to local module 18, data representative of lists defining which of the available video and/or banner advertisements a viewer has watched, a list of available banner and/or video advertisements arranged according to the advertisement type, and other data related to the video and/or banner advertisements.

2. Set-Top Boxes

A significant benefit of the present invention is that it can be used to display banner advertisements and related video advertisements using existing set-top boxes that may not have been initially designed to generate or display such advertisements. For instance, video advertisements can be displayed using set-top boxes that may not have a large amount of memory or mass data storage by delivering the video advertisements to the set-top box in real time using an MPEG video stream. Accordingly, the invention can be practiced with set-top boxes other than that depicted in FIG. 3, including set-top boxes that have fewer components.

Figure 3:
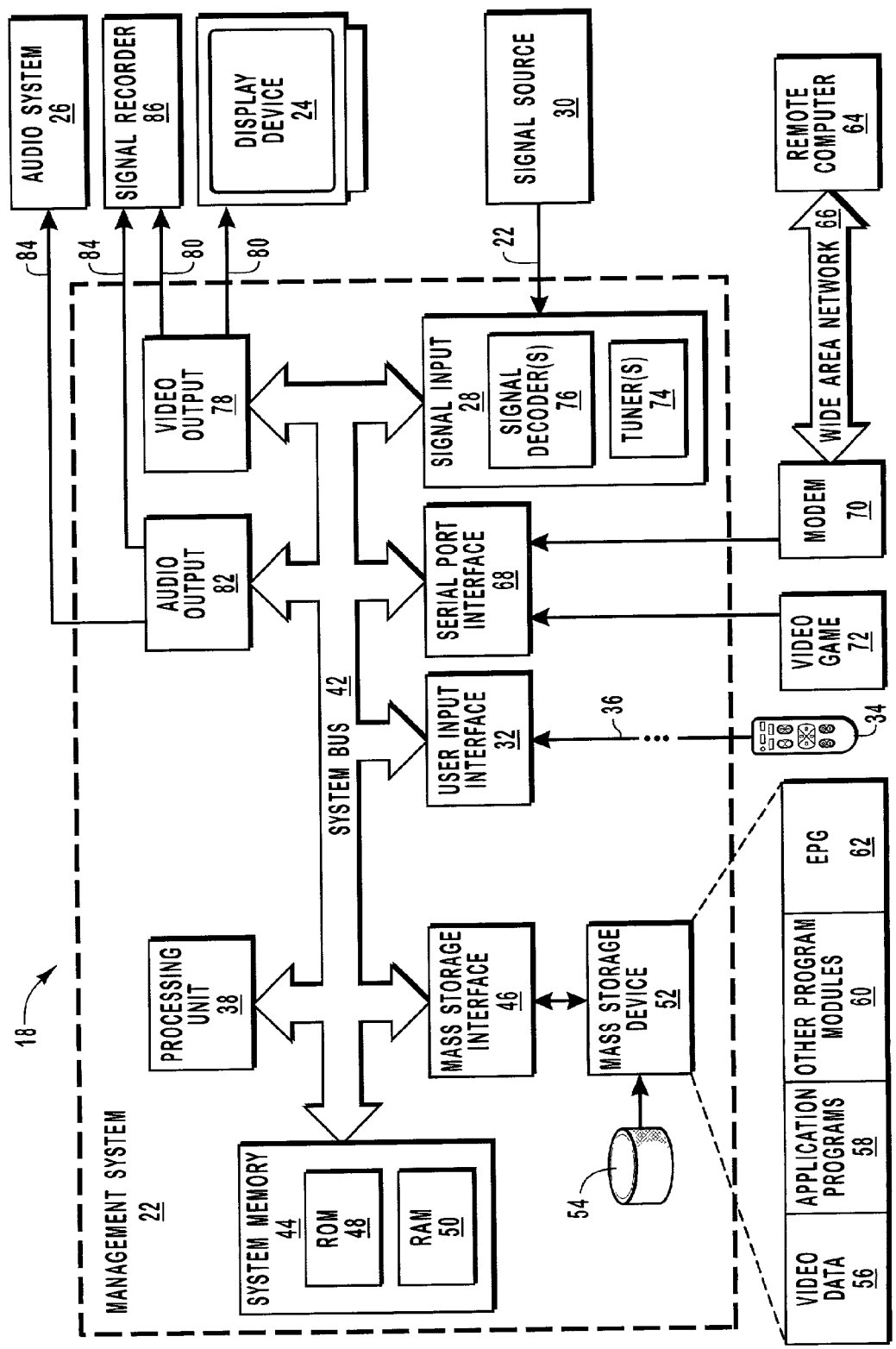
FIG. 3 illustrates an exemplary local system of the illustrative operating environment of FIG. 2.

Referring now to FIG. 3, a schematic representation of one embodiment of local module 18 is depicted. Local module 18 may include a management module or system 22, a display module or device 24, and an audio module or system 26. Generally, local module 18 broadly represents a television-viewing environment, whether such environment is located in a viewer's home, at a place of business, in the public, or at any other location. Such local module 18 can represent an existing set-top box or other similar device that is capable of being programmed or otherwise configured to perform the methods and functions of the present invention.

Although local module 18 is depicted as including various separate components, it may be understood that such components may be combined into a single system or device. For instance, management system 22 can be integrally combined with or separate from display device 24, which is capable of displaying video programming or viewable video image data, broadcast programming, banner advertisements, video advertisements, and the like. Similarly, management system 22 may be integral with or separate from audio system 26, which may be a speaker, a stereo system, or any device capable of emitting sound data.

In one illustrative configuration, management system 22 of local module 18 is a set-top box or Internet terminal that can perform typical functions associated with a set-top box, while also performing those novel operations disclosed herein. Further, management system 22 represents any type of consumer electronic device capable of performing the functions described herein. For instance, management system 22 can be a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), and any other device capable of processing data or performing the functions as described herein.

Management system 22, in one embodiment, receives programming, i.e., a signal input 28, such as the viewable portions of moving image data, audible portions of sound data, or a combination of such image data and sound data from a signal source 30, such as program module 12 and/or enhanced content module 14, along one or more programming input lines 22, one being illustratively shown. The signal input 28 includes one or more tuners 74 and one or more signal decoders 76, one of each being illustratively shown. Each tuner 74 allows signal input 28 to receive multiple channels of data from signal source 30, while each signal decoder 76 of signal input 28 can decode video data from a compressed video format (e.g. MPEG) and video data from an analog format to a digital format, or from a digital format to an analog format, depending upon the operation of management system 22.

As illustrated, management system 22 can include a viewer input interface 32 that receives input from an input device 34 over an input link 36. Input device 34 generates instructions to control the operation of management system 22, such as operating Web browser software within management system 22 when management system 22 is a set-top box or an Internet terminal. Input device 34, therefore, may take the form of a remote control, a keyboard, a microphone, or any other device capable of generating instructions for management system 22.

To operate and implement various functions of management system 22, management system 22 can include a processing unit 38, i.e., a central processing unit ("CPU"). The processing unit 38 incorporate software and/or hardwired logic circuitry that uses computer-executable instructions, such as those of the present invention, to control and implement the functions of management system 22.

Typically, processing unit 38 can be coupled via a system bus 42, which interconnects various other system components, such as system memory 44, mass storage interface 46, viewer interface 32 and signal input 28. Instructions, data, and other software necessary for the operation of processing unit 38 can be stored in system memory 44, such as in read-only memory ("ROM") 48 and/or in random-access memory ("RAM") 50, and/or in optional mass storage device 52, such as a magnetic hard disk 54 or any other magnetic or optical mass memory device that is capable of storing data, including video data 56, application programs 58, other program modules 60, an updateable electronic programming guide ("EPG") 62, or any other desired computer-readable instructions or data. Such ROM 48, RAM 50, and mass storage device 52 are communicatively coupled to ASIC 40, thereby allowing data to be readable by ASIC 40 and written from ASIC 40 to RAM 50 and possibly mass storage device 52.

In this illustrative configuration, management system 22 is capable of communicating with a remote computer 64 via a wide area network ("WAN") 66, such as the Internet, by way of a serial port interface 68 interposed between system bus 42 and a modem 68. While serial port interface 68 may be used to connect modem 70 for communicating across a WAN, serial port interface 68 may also be utilized to connect other consumer electronic devices, such as video game 72, and/or various input devices, such as a keyboard (not shown) or joystick (not shown), to management device 12. Additionally, instead of modem 70, some other wireless link or other means for establishing communications over a communication line connection may be included, either internally or externally to management system 22. Further, in other configurations of the presently described illustrative environment, management system 22 may be capable of transmitting information via the Internet by direct-dial communication over standard telephone lines, or by using any other available communication medium or communication line connection.

Although modem 70 as illustrated as being separate from management system 22, it can be understood that module 70 can be incorporated within management system 22, such as with signal input 28. Consequently, other embodiments of management system 22 can optionally exclude serial port interface 68.

Management system 22 may also include a video output 78, which may include a video encoder and/or a video converter. Typically, the video encoder and switches between analog and digital formats assign a code to frames of video data that are transmitted across a video image link 80, examples of which include a radio-frequency ("RF") link, an S-video link, a composite link, or any other equivalent form of video image link. Similarly, audio output 82 can include an audio converter to provide switching between analog and digital formats. Such audio and video signals may be recorded by a signal recorder 86, which is capable of receiving video and/or audio data and recording the data on a storage medium, as known by one skilled in the art.

According to another aspect of the present invention, local module 18 can be configured to store information regarding selections made by the viewer through the interaction of input device 34 with local module 18. For example, when the available video advertisements include a mix of national advertisements and pay-per-view or other video on demand advertisements, local module 18 can store data representative of a viewer selecting to watch pay-per-view and/or video-on-demand programming later. Consequently, local module 18 can log or store within mass storage device 52 and/or system memory 44 data representative of a reminder to be displayed to the through display device 24 of the availability of the selected pay-per-view or video-on-demand programming. Further, in the event that the viewer or viewer selects to view such pay-per-view or video-on-demand by "clicking on" or selecting the video advertisement through use of input device 24, local module 18 can store billing information associated with the pay-per-view or video-on-demand programming within mass storage device 52, which can be transferred to the program provider or some other broadcast provider for billing to the viewer.

3. Displaying Banner Advertisements and Video Advertisements

Figure 4:
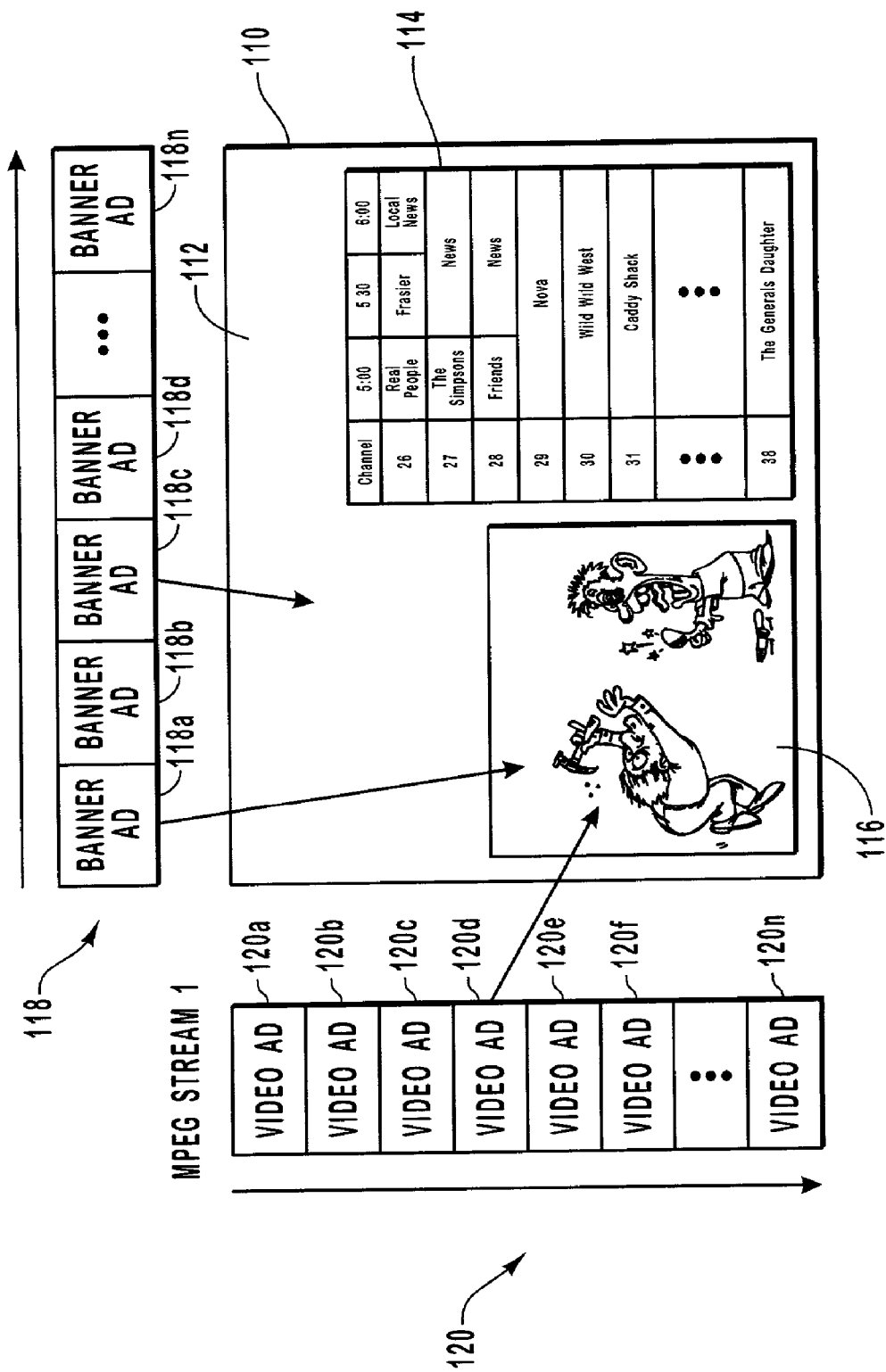
FIG. 4 schematically represents a displays screen deliverable to a viewer through the local system of FIG. 3.

FIG. 4 illustrates an EPG display screen 110 on which video advertisements are to be displayed. As noted above, the methods of the present invention can relate to displaying a banner advertisement associated with video advertisements during the period immediately preceding the beginning of the video advertisement. For example, if a viewer were to cause the EPG display screen 110 to be displayed, it is likely that the EPG display screen would be initially displayed at a point in time perhaps several seconds prior to the time at which the next video advertisement delivered to the set-top box is available. Rather than displaying a blank advertisement box 116, a banner advertisement relating to the next video advertisement is displayed in advertisement box 116 until such time that the related video advertisement is received and is available to be displayed as will be further described below. In this manner, the banner advertisement provides a smooth transition to the first video advertisement that is displayed in advertisement box 116.

While the method of displaying a banner advertisement related to a video advertisement is particularly useful during the seconds immediately preceding the first video advertisement displayed to a viewer, the method can also be used to transition to subsequent video advertisements. Often, a continuous series of video advertisements can be displayed to the viewer after the first video advertisement without requiring the use of transitioning banner advertisements. However, when multiple MPEG data streams are used; when a viewer requests additional information, such as from the Internet, regarding a video advertisement; or when there is break in the sequence of video advertisements, such as caused by a change in the delivery rate of the video data associated with the video advertisement from program module 12 (FIG. 1), transitioning banner advertisements can again be used to avoid displaying a blank region in advertisement box 116 prior to the display of a subsequent video advertisement.

In addition, the present invention can use a banner advertisement to transition between two video advertisements displayable to a viewer, whether or not such advertisements are displayed as part of the EPG. For instance, a banner advertisement can transition between two full screen video advertisements displayable to the viewer to accommodate for changes in the delivery rate of the video data associated with the video advertisement. Further, in the case where local module 18 includes two tuners, the present invention can display a banner advertisement that transitions between video advertisements that are simultaneously displayable to the viewer as the viewer watches television programming. In addition, the present invention can transition between banner advertisements and video advertisements, even if no time delay exists between the end of one video advertisement and some subsequent video advertisement, such as the case where a continuous stream of video advertisements are interspersed with banner advertisements from a second stream deliverable to local module 18.

FIG. 4 depicts an exemplary display screen that may be presented to the viewer through display device 24. Surrounding the display screen is a schematic representation of the video advertisements and banner advertisements that may be displayed to the viewer. More specifically, the schematically represented video advertisements and banner advertisements can be retrieved from data storage at program module 12, enhanced content module 14, local module 18 (FIG. 2), or some other module. As illustrated, display screen 110 includes a background 112, an electronic program guide 114, and an advertisement box 116. Background 112 of display screen 110 may have various configurations depending on the particular operation of local module 18. For example, background 112 may include one or more advertisements, such as one or more banner advertisement 118a–118n. In another configuration, background 112 may be blank or have a configuration defined by the electronic program guide 114, the broadcast programming provider, local module 18, or the like.

Electronic program guide 114 of display screen 110 provides the viewer with a schedule of broadcast programming presented as a time-based grid; time blocks commonly being arranged as columns, while different channels and services are arranged in rows. Commonly, program titles are displayed in the grid at the intersection of the time at which the program airs and the channel on which the program is broadcast. Alternatively, electronic program guide 114 can provide a list of programming on a per channel basis, with the time associated with the broadcast programming or services incorporated within a portion of the display. Various different configurations of electronic program guide 114 are known by those skilled in the art in view of the teaching contained herein.

Associated with display screen 110 is advertisement box 116. Advertisement box 116 is configured to display both banner advertisements 118a–118n and video advertisements 120a–120n to the viewer. More specifically, advertisement box 116 has coordinate information that defines the space within which management system 22 may cause video advertisements 120a–120n to be played and the confines of the area within which banner advertisements 118a–118n are displayed.

Delivery of advertisements 118a–118n and 120a–120n to advertisement box 116 may be via one or more MPEG streams 1-n and/or data streams 1-n. Alternatively, such banner and/or video advertisements 118a–118n and 120a–120n that can be displayed with advertisement box 116 can be stored within mass storage device 52 (FIG. 3) of local module 18 and retrieved therefrom as needed if the set-top box has sufficient mass storage capacity. Such stored banner and/or video advertisements 118a–118n and 120a–120n can include banner and/or video advertisements 118a–118n and 120a–120n that were initially received via MPEG streams 1-n and/or data streams 1-n or can be other banner and/or video advertisements 118a–118n and 120a–120n that were stored in mass storage device 52 in some other manner known to one skilled in the art, such as during manufacture of the local system or installation of the local system.

As schematically represented, display screen 110 is configured to accommodate the display of one or more video advertisements 120a–120n of a looped group of video advertisements 120a–120n, designated by reference numeral 120 and one or more banner advertisements 118a–118n of a looped group of banner advertisements 118a–118n, designated by reference numeral 118. Alternatively, display screen 110 may accommodate looped group 120, while retrieving individual banner advertisements that are not defined as looped group 118. Similarly, display screen 110 may accommodate looped group 118, while retrieving individual video advertisements that are not defined as looped group 120.

Each looped group 118, 120, according to one configuration, can be delivered substantially continually to local module 18 via either MPEG streams 1-n or data streams 1-n. Stated another way, upon completing delivery of video advertisement 120n to local module 18 along MPEG stream 1, for example, such MPEG stream 1 subsequently delivers video advertisement 120a and then 120b, etc. to local module 18. It may be appreciated by one skilled in the art, however, that looped group 118 can also be delivered to local module 18 in a similar manner and that looped groups 118, 120 can be delivered to local module 18 via one or more MPEG streams 1-n and/or one or more data streams 1-n.

Figure 5:
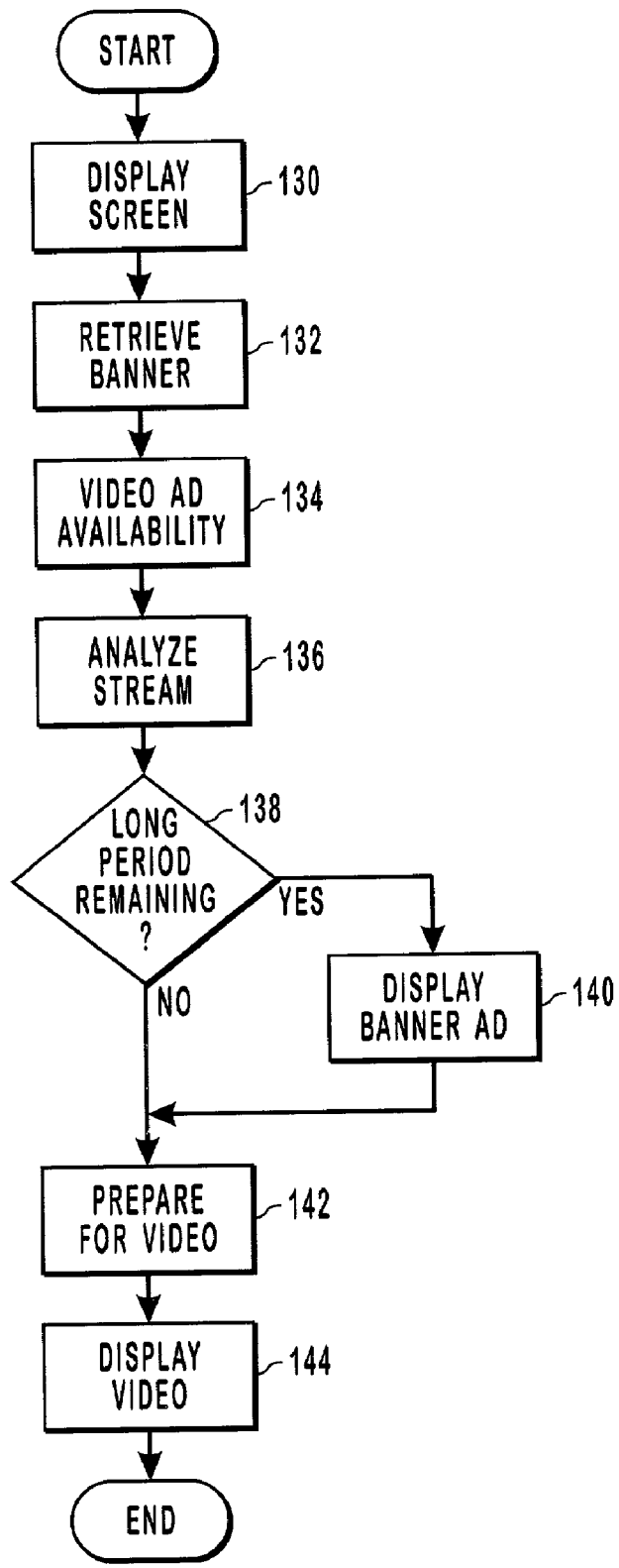
FIG. 5 is a flow diagram representation of the manner by which a banner advertisement is used to transition between on video advertisements in accordance with the present invention.

Referring to FIG. 4 and 5 together, a discussion of the operation of system 10 is recited. Reference will be made herein to the interaction of one or more banner advertisements 118a–118n and video advertisements 120a–120n as they relate to display screen 110, where display screen 110 optionally displays electronic program guide 114 to the viewer. It may be appreciated that the present invention may be implemented in a variety of other manners and for a variety of different display screens as may be understood in view of the teaching contained herein. For example, display screen 110 may be devoid of electronic program guide 114. Further, in another configuration, one or more banner advertisements 118a–118n and video advertisements 120a–120n may be displayed to the viewer during normal broadcast programming in a similar manner as a browser mode electronic program guide is displayed to the viewer or when two tuners are used within local module 18.

With regard to the following discussion, it is assumed that video advertisements 120a–120n are deliverable to local module 18 along a single MPEG stream, such as MPEG stream 1. It is further assumed that banner advertisements 118a–118n are stored at local module 18 and are not deliverable to local module 18 along a MPEG stream or data stream as display screen 110 is watched by a viewer.

Upon a viewer activating input device 34 (FIG. 3), processing unit 38 presents display screen 110 on display device 24. Associated with presenting display screen 110 to a viewer, processing unit 38 retrieves one or more banner advertisements 118*a*–118*n* for display to the viewer, as represented by block 130. Specifically, by activating input device 34 (FIG. 3), processing unit 38 retrieves display screen 110 and one or more generic or standardized banner advertisements 118*a*–118*n*, such as banner advertisements 118*a* and 118*c*, from a data source, such as mass storage device 52 (FIG. 3). Consequently, at least one banner advertisements from the available banner advertisements 118*a*–118*n* are displayed to the viewer in background 112, i.e., banner advertisement 118*c* and/or advertisement box 116, i.e., banner advertisement 118*a*. In another configuration, processing unit 38 can identify an MPEG stream 1-*n* and/or data stream 1-*n* from which processing unit 38 may retrieve the one or more banner advertisements 118*a*–118*n* when no banner advertisements are stored within mass storage device 52 or when set-top box identifies new banner advertisements available from program module 12, enhanced content module 14, or some other source (FIG. 2).

As local module 18 retrieves one or more of banner advertisements 118*a*–118*n* as part of display screen 110, as represented by block 132, processing unit 38 may analyze the information stored within mass storage device 52 and/or system memory 44 to determine which banner advertisements 118*a*–118*n* have previously been displayed to the viewer. For example, processing unit 38 may search data representative of those banner advertisements 118*a*–118*n* previously viewed by the viewer and the actions taken while the viewer participated in an enhanced programming experience. Consequently, processing unit 38 can select the appropriate banner advertisement 118*a*–118*n* to be displayed within background 112 and/or advertisement box 116. Optionally, instead of determining which banner advertisements the viewer has watched before, local module 18 (FIG. 2) may select any banner advertisement, whether or not such banner advertisement was previously watched by the viewer. Additionally, the processor can compare a viewer's preferences to different types of advertisements against banner content identifiers for each banner advertisement 118*a*–118*n*; consequently selecting appropriate banner advertisements 118*a*–118*n* that coincide with the viewer's preferences. The viewer's preferences may be included in preference data representative of information regarding the types of banner advertisements the viewer would wish to view based upon demographic information about the viewer, prior viewing selections made by the viewer, responses to questionnaires directed to the viewer, and the like. Alternatively, the processor can receive preferences or preference data in the form of scripts or other codes from program module 12 that causes the processor to optionally search a stored viewing history of the viewer and select a particular video advertisement and/or banner advertisement to be displayed to the viewer.

Following display of the selected banner advertisement(s) 118*a*–118*n*, local module 18 identifies the particular video advertisements 120*a*–120*n* that are available upon MPEG streams 1, as represented by block 134. More specifically, based upon the current time at the location of the viewer, i.e., the time defined by a clock (not shown) contained within local module 18, the data representative of those video advertisements 120*a*–120*n* deliverable to local module 18 for the current viewing time are reviewed. For example, local module 18 may review data defining start times, length of play for each video advertisement, the sequence by which the looped group 120 of video advertisements 120*a*–120*n* are delivered to local module 18, and the like. Further, local module 18 may review video content identifiers for each of the available video advertisements 120*a*–120*n* to determine which, if any, comply with the viewer's preferences for specific types of video advertisements.

Figure 6:
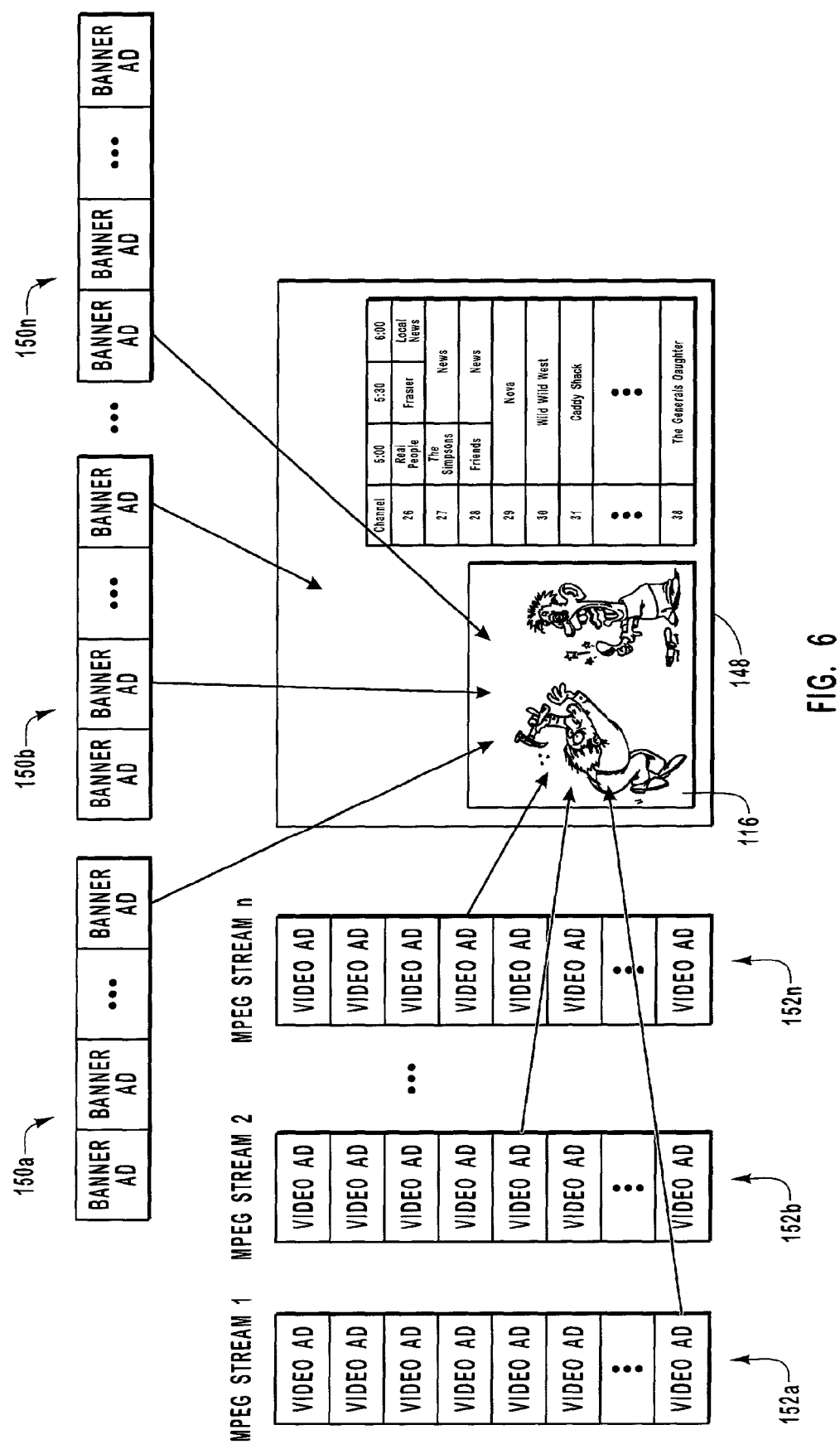
FIG. 6 schematically represents a displays screen deliverable to a viewer through the local system of FIG. 3 in accordance with another illustrative embodiment of the present invention.

Local module 18 determines which advertisement of video advertisement 120*a*–120*n* is to start at a time close to the time defined by the clock within local module 18, and optionally which video advertisements 120*a*–120*n* are in accord with the viewer's preferences. For example, if video advertisement 120*c* is currently being delivered to local module 18 via MPEG stream 1, local module 18 will define video advertisement 120*d* as the next available video advertisement. This process may be somewhat more complex when there are multiple MPEG streams 1-*n* with multiple video advertisements 120–120*n*, as illustrated in FIG. 6 and discussed hereinafter.

Once local module 18 has identified video advertisement 120*d* as the next available advertisement, local module 18 analyzes MPEG stream 1, as represented by block 136 to search for enhanced content on MPEG stream 1. By checking the enhanced content, and more specifically one or more triggers, local module 18 can identify how much time remains before video advertisement 120*d* begins. Specifically, local module 18 searches for the announcement associated with video advertisement 120*d* and the zero or more triggers associated with the preceding video advertisement 120*c*. Such triggers can designate the time remaining before commencement of video advertisement 120*d*.

Even though local module 18 identifies how much time is remaining before the next video advertisement is to begin, for example video advertisement 120*d*, changes in the delivery rate of the advertising content can vary over network 16 (FIG. 1). Further, the bit rates of the hardware of program module 12 can vary, thereby changing the time when the advertisement is to begin. Through use of the transition banner advertisements, local module 18 can accommodate for such variations by displaying additional banner advertisements when local module 18 determines that the video advertisement to be displayed has not yet been received by local module 18. For instance, local module 18 can determine, at a point in time close to the time identified by the triggers as the beginning time of the video advertisement, whether all of the data associated with the video advertisement has been received by local module 18. In the event that not all data is received, local module 18 will display another banner advertisement.

According to another aspect, in the event that local module 18 identifies that the currently viewable video advertisement 120*c* has 13 seconds remaining to play, local module 18 can determine if this is too long a period to wait for delivery of video advertisement 120*d*, as represented by decision block 138. If the period is too long, local module 18 retrieves from mass storage device 52 another banner advertisement 118*a*–118*n*, such as banner advertisement 118*b*, to be displayed in advertisement box 116 and, optionally, background 112. This transition banner advertisement is typically related to the next available video advertisement to be displayed; however, the banner advertisement can be related to the particular broadcast provider, e.g., such as an AT&T® advertisement, a generic banner advertisement, some other banner advertisement 118*a*–118*n* generally related to the next available video advertisement, or some banner advertisement that local module 18 identifies as one of a variety of different types of video advertisements that a viewer may wish to watch based upon demographic information and/or past viewing activities of the viewer, or other appropriate information or data.

As the time period for viewing video advertisement 120d arrives, local module 18 prepares to deliver video advertisement 120d to the viewer, as represented by block 142. Such preparation may include tracking the amount of time left before video advertisement 120d is available.

As local module 18 receives the enhanced content, such as but not limited to, announcement, triggers, and/or packages, which identify the content of video advertisement 120d, local module 18 transitions from banner advertisement 118d displayed within advertisement box 116 to video advertisement 120d, as represented by block 144. Such transition may include fading banner advertisement 118d while local module 18 switches to MPEG stream 1 to deliver video advertisement 120d. For instance, tuner 74 (FIG. 3) may tune to the appropriate MPEG stream, i.e., MPEG stream 1 is this illustrative configuration, and delivery the signals associated with video advertisement 120d to display device 24. Various other manners by which banner advertisement 118d may transition to video advertisement 120d.

Referring now to FIG. 6, depicted is another exemplary display screen that may be presented to the viewer through display device 24. The majority of the features and functions of this illustrative display screen are similar to those described above with reference to FIGS. 4 and 5.

As illustrated, surrounding the display screen is a schematic representation of the video advertisements and banner advertisements that may be displayed to the viewer via display device 24. In contrast to display screen 110 illustrated in FIG. 4, display screen 148 may display video advertisements from multiple groups of banner advertisements and multiple groups of video advertisements such groups being designated by reference numerals 150a–150n and 152a–152n, respectively. These groups may be looped, i.e., the same group of video advertisements is repeatedly delivered along the same or a different MPEG stream to local module 18, may be deliverable to local module 18 on-demand, or may be delivered once and stored at local module 18.

Various video advertisements may be included within each group 152a–152n. For example, in one configuration, the same video advertisements are contained within each group 152a–152n while being time shifted or displaced one from another. In another configuration, each group 152a–152n contains the same type of video advertisements, i.e., has the same or substantially similar video content identifiers, such identifiers defining the video advertising content as relating to sports, automobiles, clothing, travel, broadcast programming, and the like. One skilled in that art may appreciate that each group 150a–150n may contain banner advertisements that are time shifted or specific to a particular type of advertisement, i.e., specific to a particular banner content identifier.

By providing multiple groups of advertisements upon multiple MPEG and/or data streams, local module 18 has a greater number of advertisements to choose from at any given time period. Consequently, local module 18 can retrieve video advertisements in accordance with targeting information retrieved from program module 12, enhanced content module 14 or targeting information stored within mass storage device 52 or system memory 44. Such targeting information can be considered one type of viewer preference or preference data as described above. Consequently, the present invention may allow a viewer to define viewer preferences for the type of advertisement they wish to view or the present invention may automatically identify viewer preferences or targeting information based upon demographic information of the viewer, previous viewer viewing activities, decisions made by program module 12, enhanced content module, or the like. Such preferences or preference data and/or target information can be stored either locally or remotely.

In operation, local module 18 may analyze the data stored within mass storage device 52 and/or system memory 44 to identify which video advertisements of all available advertisements can be displayed to the viewer via display device 24. In another configuration, local module 18 may determine which advertisements are to be displayed from those advertisements meeting the preferences of the viewer, i.e., in accordance with defined banner content identifiers and/or video content identifiers can be displayed to the viewer via display device 24.

In this manner, local module 18 can determine which advertisements of the available video advertisements in each group 152a–152n is to start at a time close to the time defined by the clock (not shown) within local module 18. Consequently, local module 18 can select the video advertisement based upon which video advertisement best meet the preferences of the viewer, has a start time closest to the current time, and/or has not been watched by the viewer before.

Following the selection of the video advertisement, local module 18 identifies when the video advertisement is to be received by local module 18 and determines whether additional banner advertisements are to be displayed to the viewer due to delays in the delivery of the video data associated with the video advertisement from program module 12 (FIG. 1). In the event that no delays have occurred, local module 18 retrieves the video advertisement, transitions between the banner advertisement and the video advertisement, displays the video advertisement in a similar manner to that described previously, and subsequently repeats the above as desired by the viewer, program module 12, enhanced content module 14, and/or local module 18. For example, as illustrated, a banner advertisement may initially be displayed within advertisement box 116. Consequently, the banner advertisement may be transitioned to display a video advertisement from group 152b on MPEG stream 2.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a broadcast system that includes a program provider that distributes broadcasts to one or more terminal processing devices, wherein the terminal processing devices comprise a processor and a display device on which video programming from a video provider can be displayed, a method for transitioning to a video advertisement by displaying a related banner advertisement at a terminal processing device, the method comprising the acts of:

receiving at the terminal processing device one or more video streams containing a plurality of real-time video advertisements from a video provider which begin at a plurality of distinct times;

generating, at the terminal processing device on the display device, a display screen having an advertisement region in which one or more real-time video advertisements are to be displayed;

determining at the terminal processing device that only a tail end of a current real-time video advertisement contained within the one or more video streams is available, in that a begin time for the current real-time video advertisement has passed;

determining at the terminal processing device that a next real-time video advertisement is not yet available for display based on enhanced content received from the video provider, in that a begin time for the next real-time video advertisement has not yet been reached;

identifying at the terminal processing device a banner advertisement having subject matter that is related to that of at least one of the real-time video advertisements;

while waiting for the begin time of the next real-time video advertisement, displaying at the terminal processing device the banner advertisement within the advertisement region;

determining at the terminal processing device that the next real-time video advertisement is available for display, in that the begin time for the next real-time video advertisement has been reached; and at the begin time of the next real-time video advertisement, replacing at the terminal processing device the banner advertisement with the next real-time video advertisement.

2. A method as recited in claim 1, wherein the display screen comprises an electronic program guide.

3. A method as recited in claim 1, wherein the display screen comprises a background region.

4. A method as recited in claim 3, wherein at least one of (i) another banner advertisement and (ii) the banner advertisement is displayed in the background region.

5. A method as recited in claim 1, wherein the banner advertisement is selected from a plurality of banner advertisements, at least two of the plurality of banner advertisements deliverable to the processor upon different delivery streams.

6. A method as recited in claim 1, wherein the banner advertisement is stored locally to the processor.

7. A method as recited in claim 1, wherein the next real-time video advertisement is selected from the plurality of real-time video advertisements, at least two of the plurality of real-time video advertisements deliverable to the processor upon different delivery streams.

8. A method as recited in claim 7, wherein the processor selects the next real-time video advertisement, the processor selecting the next real-time video advertisement based upon at least one of (i) demographic information related to the viewer of the display screen and (ii) prior viewing activities of the viewer of the display screen.

9. A method as recited in claim 1, further comprising the act of:

receiving at the terminal processing device at least one video stream comprising the plurality of real-time video advertisements, each of the plurality of real-time video advertisements comprising at least one trigger; and analyzing at the terminal processing device the at least one trigger to identify the begin time when the next real-time video advertisement is to be displayed and the subject matter of the video advertisement.

10. A method as recited in claim 1, wherein the displaying act comprises:

identifying the next real-time video advertisement to be displayed;

identifying the subject matter of the next real-time video advertisement; and selecting the banner advertisement having subject matter that is related to the subject matter of the next real-time video advertisement from a plurality of banner advertisements; and displaying the banner advertisement on the display screen.

11. A method as recited in claim 1, wherein replacing at the terminal processing device the banner advertisement with the next real-time video advertisement comprises replacing the banner advertisement with stored video, which was stored after being received from the video provider.

12. A method as recited in claim 1, wherein replacing at the terminal processing device the banner advertisement with the next real-dine video advertisement comprises replacing the banner advertisement with a video advertisement as it is delivered via one or more data streams.

13. A method as recited in claim 1, wherein the terminal processing device is a set-top box.

* * * * *